United States Patent [19]

Mahieu

[11] 3,910,264

[45] Oct. 7, 1975

[54] PASSENGER LOADING RAMP

[75] Inventor: Yves Mahieu, Hamel Arleux, France

[73] Assignee: Societe Anonyme dite: Ateliers Mecaniques du Douaisis, France

[22] Filed: Apr. 9, 1974

[21] Appl. No.: 459,392

[30] Foreign Application Priority Data

Apr. 10, 1973 France .............................. 73.13351

[52] U.S. Cl. .................... 182/63; 182/115; 182/141
[51] Int. Cl.² ...................... E06C 5/16; B64F 1/30
[58] Field of Search ............ 182/63, 101, 117, 116, 182/115, 127, 141; 14/72

[56] References Cited
UNITED STATES PATENTS

| | | | |
|---|---|---|---|
| 3,664,456 | 5/1972 | Smith | 182/63 |
| 3,664,458 | 5/1972 | Stern | 182/63 |
| 3,779,596 | 12/1973 | Ritter | 182/63 |
| 3,800,912 | 4/1974 | Ashworth | 182/127 |
| D146,202 | 1/1947 | Varrieur | 182/127 |

*Primary Examiner*—Reinaldo P. Machado
*Attorney, Agent, or Firm*—Robert E. Burns; Emmanuel J. Lobato; Bruce L. Adams

[57] ABSTRACT

Mobile steps of the multi-flight, constant pitch type for allowing passengers access to the doors of aircraft. Two rigid flights of steps are provided, a lower flight fixed to the chassis of a vehicle and leading to a landing connecting the lower flight to an upper retractable flight having a platform. The platform is raised and lowered to suit the height of the aircraft door above ground level by ram-operated telescopic tubes, thereby vertically moving the retractable flight of steps without moving the platform horizontally and without altering the pitch and inclination of the steps in use. To save space, the retractable flight may be in two portions hinged together, the portions being rigidly fixed in alignment in use and folded within a housing when fully retracted. A horizontal retractable floor connects the lowermost usable step of the upper flight to the landing, the floor covering the housing when the retractable flight is fully retracted and gradually retracting as the said flight is elevated.

10 Claims, 8 Drawing Figures

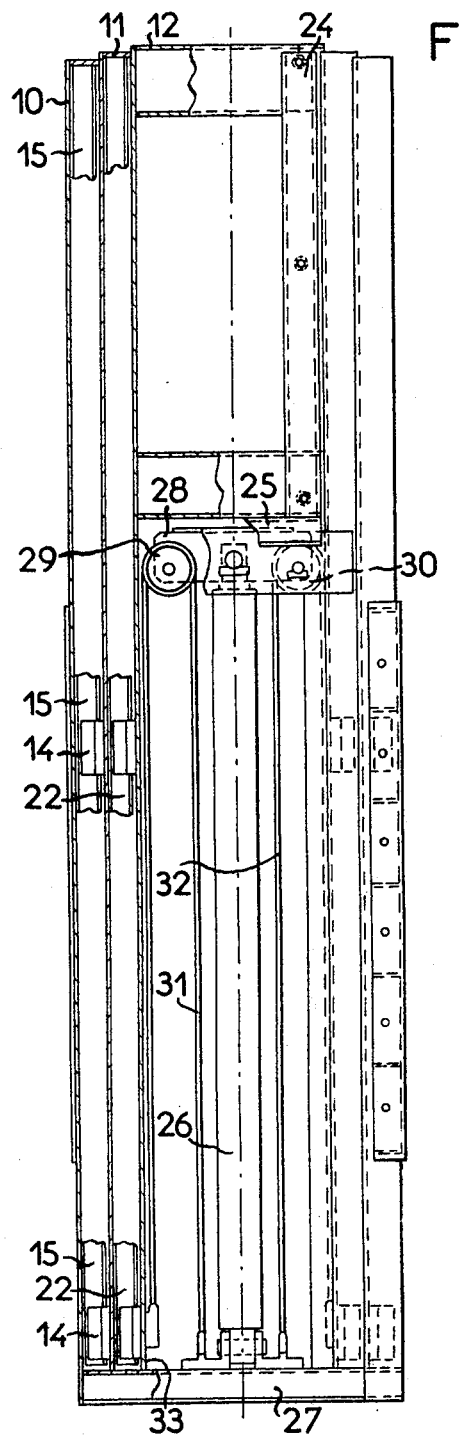
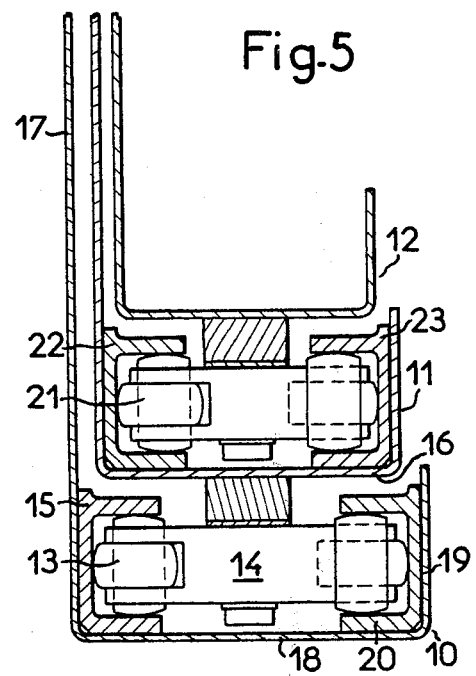
Fig.4
Fig.5

PASSENGER LOADING RAMP

BACKGROUND OF THE INVENTION

The present invention relates to a passenger loading ramp or unit of mobile steps, particularly for allowing passengers access to the doors of aircraft. It relates more particularly to mobile steps of the multiple-stage, constant pitch kind.

As aircraft doors are at various heights, at present ranging from 2.2m to 5.3m, according to the type of aircraft, steps have to be constructed of which the height can be adjusted to suit the greatest possible number of aircraft.

Steps are known which comprise, on a framework fitted with wheels, a flight of steps of which the two stringers consist of deformable parallelograms to which the steps are articulated. The level of the upper step can thus be adjusted by inclining the stringers, the individual steps nevertheless remaining horizontal.

The major drawback of steps of this kind is immediately obvious; as the number of individual steps is always the same, whatever the level of the top one, the "pitch" of the steps will vary with the said level. Steps of this kind can thus only be adjusted to a limited range of levels, very close to one another, as otherwise the pitch becomes either too great or too small for the convenience of the users.

Telescopic stepladders, which partly dispose of this inconvenience, are already known. Generally mounted on a motor vehicle, mobile steps of this kind comprise two flights of steps, with a fixed angle of inclination, situated one below the other. To vary the level of the upper step, generally consisting of a platform, it is only necessary to slide the lower flight of steps along the upper one, in the manner of an extending ladder.

Steps of this kind have a wider field of action, although its maximum height is limited to less than twice its initial height, but it nevertheless involves a number of drawbacks.

One of these disadvantages becomes evident when the aircraft is approached. As the length of the vehicle as a whole varies with the level of the upper platform, the distance between the drive and the cockpit has to be greater, for example, when a higher level is to be reached; furthermore, turns of a greater radius have to be negotiated on a level with the end of the step ladder. The approach to the aircraft thus calls for considerable skill on the part of the driver, who literally has to aim at the door.

A further drawback of steps of this kind resides in its instability when the lower flight of steps is extended and thus "overhangs" the "supporting polygon" of the vehicle.

Finally, as the two parts of the gangway naturally form linear prolongations of each other, the user leaving a particularly high aircraft finds he has to proceed over a long narrow flight of steps, liable to cause giddiness.

The general object of the invention is to remedy these drawbacks by providing mobile steps of which the stairs have a constant "pitch" and which offers a more adequate range of operating levels while at the same time occupying a constant and more moderate amount of space in the horizontal plane, in order to facilitate maneuvers.

SUMMARY OF THE INVENTION

According to the invention, there is provided a loading ramp comprising, a chassis, a fixed lower flight of steps on said chassis, a retractable upper flight of steps on said chassis integral with a substantially horizontal platform, and means for moving and guiding the platform vertically without displacing the platform horizontally in respect of the chassis, whereby the area occupied by the steps as a whole, and the "pitch" and the angle of inclination of that part of the retractable flight of steps in use, remains constant.

Advantageously, the upper step of the fixed flight of steps is connected to the lower step of the retractable flight of steps by a generally horizontal passage, said passage being either wholly or partly retractable in such a way as to balance out the variations occurring in the area which that part of the retractable flight of steps which is in use occupies in a horizontal plane when the said retractable flight of steps is to some extent retracted.

As the two flights of steps can be placed "head to tail," the space occupied is reduced and the kind of view which causes giddiness is avoided.

Furthermore, the retractable flight of steps may be of the folding kind. Thus it can be constructed to ample dimensions and nevertheless caused to occupy very little space when folded and retracted.

BRIEF DESCRIPTION OF THE DRAWINGS

An embodiment of the invention will now be described by way of example, with reference to the accompanying drawings in which:

FIG. 4 is a side view, partly broken away, of one of the two sets of telescopic tubes supporting the platform;

FIG. 5 is a linear half-section through one of the two sets of telescopic tubes;

DESCRIPTION OF PREFERRED EMBODIMENT

Figure 1:
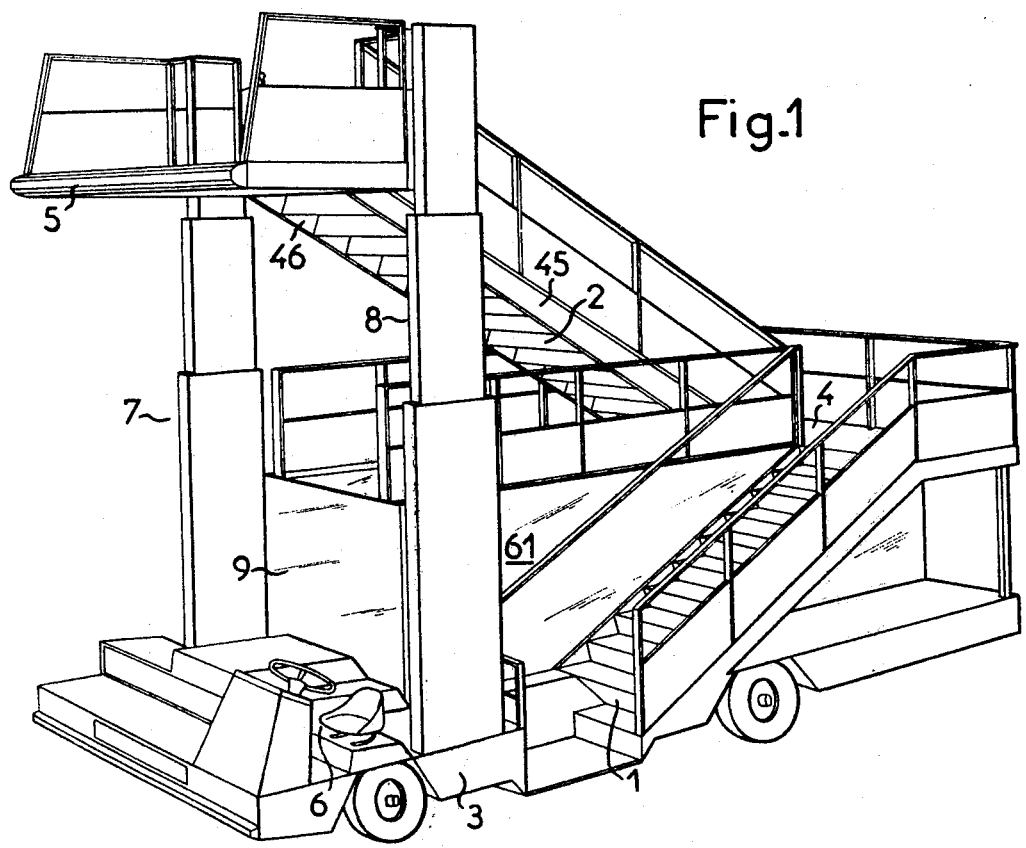
FIG. 1 shows a view, in perspective, of mobile steps according to the invention, in an elevated position.
Figure 2:
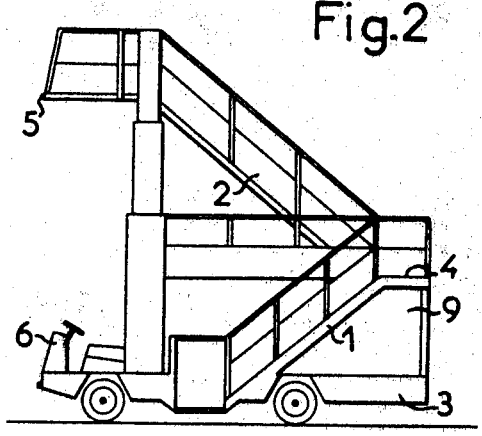
FIG. 2 is a schematic lateral view of mobile steps according to the invention, in the elevated position.
Figure 3:
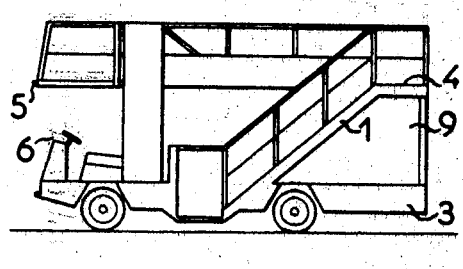
FIG. 3 is a schematic lateral view of mobile steps according to the invention, in a lowered position.

FIGS. 1 to 3 show a fixed oblique flight of steps 1 and a retractable flight of steps 2 of which the mobile steps according to the invention consists. In one preferred embodiment of the invention these two flights of steps are positioned head to tail and side by side on a chassis 3 of a motor vehicle and are interconnected by a horizontal "landing" 4, situated to the rear of the vehicle.

The upper part of the retractable flight of steps 2 leads obliquely upwardly to a substantially horizontal platform 5, situated at the front of the vehicle above the driver's compartment 6.

The platform 5, open in the front part by which it is intended to make contact with an aircraft door, is connected, according to the invention, to the chassis 3 by means of telescopic vertical tubes, in this case consisting of two sets 7 and 8 each of three tubes, with a clearance on each side of the platform. These tubes only enable the platform to move vertically, so that it always remains directly above the driver's compartment, enabling the driver to manoeuvre more easily.

It can be seen from FIGS. 4 and 5 that each set of telescopic tubes consists of three vertical channel sections 10, 11 and 12, substantially equal in length and of generally rectangular cross-section, one major side of each such section being situated opposite the side of the platform and being open in order to facilitate the assembly operation.

For example, the outer section 10, which is affixed to the chassis 3, has one major external side wall 17, two minor side walls, such as 18, perpendicular to the aforementioned major wall, and flanges, such as 19, parallel to the wall 17 and to some extent closing the fourth side of the section.

The intermediate section 11 is able to slide vertically inside the outer section 10. It is guided in this sliding action by sets of rollers, such as 13, mounted in such a way as to rotate about horizontal axes and on support members such as 14, integral with its minor side wall 16, and rotating inside U-sections, such as 15 and 20, affixed to the interior of the wall 17 and to that of the flange 19 respectively.

On similar lines, the internal section 12 can slide vertically inside the section 11, within which it is guided by sets of rollers such as 21, rotating in U-sections, such as 22 and 23, integral with the intermediate section 11.

To this internal section 12 are affixed securing elements for the platform 5, in the form of a vertical sectionn 24 and a horizontal section 25, designed to support the floor of the platform.

Within each set of tubes a vertical rigged jack 26 enables the platform 5 to be raised and lowered in the vertical direction. The use of such a system enables the platform to be raised by a distance equal to a multiple of the travel of the jack, so that a jack with a shorter travel can be used for one and the same elevation.

The jack 26 acts between a base 27 of the outer section 10, affixed to the chassis 3 of the vehicle, and an inverted strap 28 bearing two pulleys 29 and 30, of which the axes are horizontal and parallel with each other. Each of these pulleys 29 and 30 serves as a return pulley for a chain 31 or 32, as the case may be, affixed by one end to the base 27 of the outer section 10 and by the other to the lower part 33 of the inner section 12. The travel of the section 12, bearing the platform 5, is thus double that of the jack 26.

When it is ascending or descending, the platform takes the retractable flight of steps 2 along with it. This flight of steps, when not in operation, i.e. when the platform 5 is in the lowered position, is accommodated in a housing 9, positioned by the side of the fixed flight of steps 1 and having the same height. The housing 9 is covered, when the retractable flight of steps 2 is within the housing, by a generally horizontal retractable passage 44 (see FIG. 6) to be described later.

Figure 6:
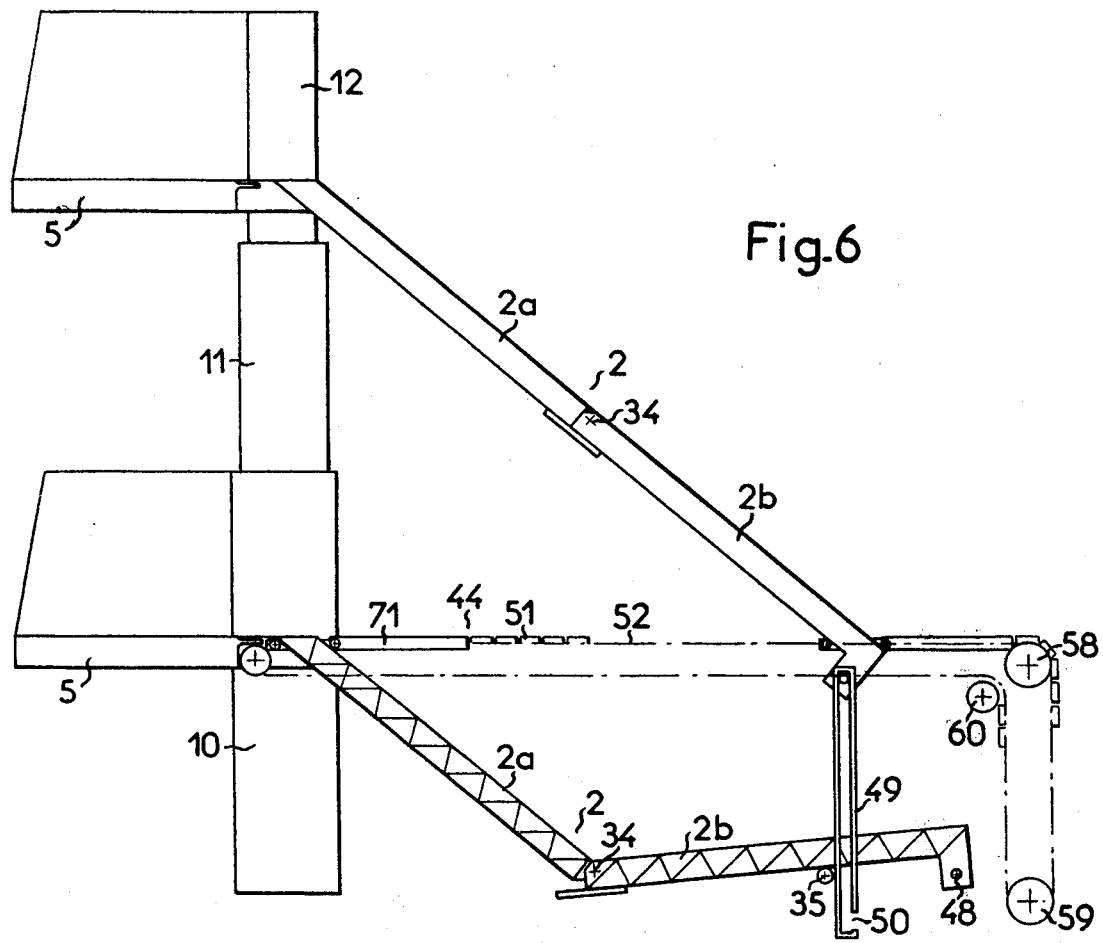
FIG. 6 is a schematic side view of the two extreme positions of the retractable flight of steps.

In a preferred embodiment shown in FIG. 6, in order to enable the retractable flight of steps 2, of which the height, when it is in operation, is greater than that of the said housing, to be nevertheless accommodated in this latter, the flight of steps is constructed in two rigid portions 2a and 2b, hinged together. The top of the upper portion 2a is integral with the platform 5; as regards the lower portion 2b, this is hinged at 34 to the bottom of the portion 2a, in order to enable the flight of steps 2 to be folded.

When the flight of steps 2 is folded inside the housing 9, the portion 2b rests on a roller 35 occupying a fixed position in relation to the housing. When the platform 5 ascends, taking along with it the portion 2a, with which it is integral, the portion 2b pivots about the hinge 34, swinging about the rotating roller 35, until reaching the position in which it forms a prolongation of the portion 2a.

Figure 7:
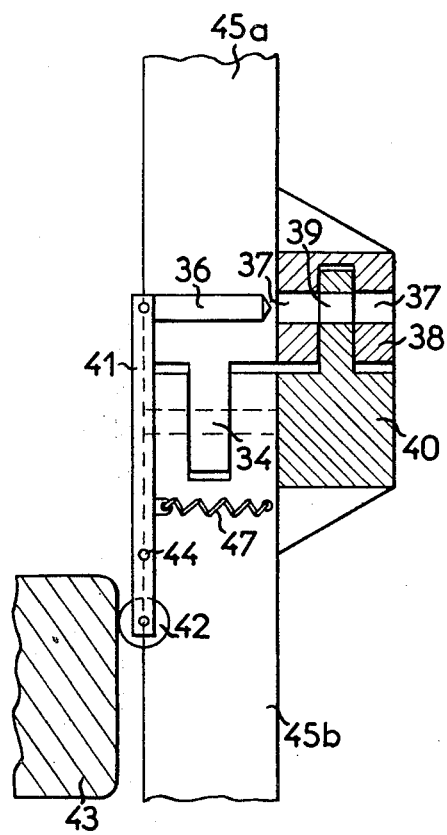
FIG. 7 is a schematic diagram, in part-section, of the locking device for the two parts of the retractable flight of steps, showing the unlocked position.

The hinge 34 is then locked in position by a locking device. The device shown in FIG. 7 by way of an example, without any limitative effect, comprises a cylindrical finger 36 which engages a bore 37 provided in a projection 38 of a stringer 45a of the portion 2a and a bore 39 provided in a projection 40 of the corresponding stringer 45b of the portion 2b. The axes of the two bores 37, 39, parallel to that of the hinge 34, coincide when the two portions of the flight of steps 2 form a straight line in which one is a continuation of the other.

The finger 36 is mounted on one end of a lever 41, fitted at its other end with a roller 42 and flexibly connected, between these two ends, at 44, to the stringer 45b of the portion 2b; a spring 47 tends to draw the finger towards the bore 39.

When, in course of the ascent, the portion 2b has almost reached the position where it forms a prolongation of the portion 2a, a stop 43, integral with the retractable passage 44, acts on the roller 42 in such a way as to draw the finger 36 from the bore 39. When the two portions 2a, 2b have reached the position in which each forms a linear prolongation of the other, the portion 2a having continued its ascent, the stop 43 releases the roller 42; the finger 36, drawn back by the spring 47, penetrates the bores 37 and 38, which are then aligned with each other.

The two portions 2a and 2b of the flight of steps 2 are then rigidly interconnected and the portion 2b rises vertically, without changing its direction any further. Its lower end is guided by rollers, such as 48, moving in fixed vertical guides, such as 49, which they enter at the point 50 as soon as the two portions of the flight of steps are aligned with each other.

As the length, at the base, of the useful part of the retractable flight of steps 2 varies according to the part of the height which has emerged from the housing, a means has to be provided for moving the retractable passage 44 horizontally, as its function is to balance out the said variations in length.

In the present case the passage 44 is borne by driving chains, such as 52, (see FIG. 8) positioned longitudinally in relation to its general direction, along the walls of the housing 9. These chains bear rollers 55 guided horizontally in the upper part of the housing between horizontal and parallel rails, such as flanges 53 and 54. In order not to occupy excessive space, the passage 44 is made up of transverse horizontal plates 51, to enable it to be rolled up. The chains, such as 52, are subjected, at the points marked 58, 59 and 60, to deflecting pulleys of which the purpose is to accommodate the inoperative part of the passage in the housing 9, below the level of the part of the passage which is in operation, and to enable the two ends of each chain to be connected to a device such as shown in FIG. 8.

A device of this kind, enabling the movement of the passage 55 to be rendered dependent on that of the retractable flight of steps 2, acts in conjunction with each of the two stringers 45 and 46 of the flight of steps 2, in the upper part of the housing 9.

Figure 8:
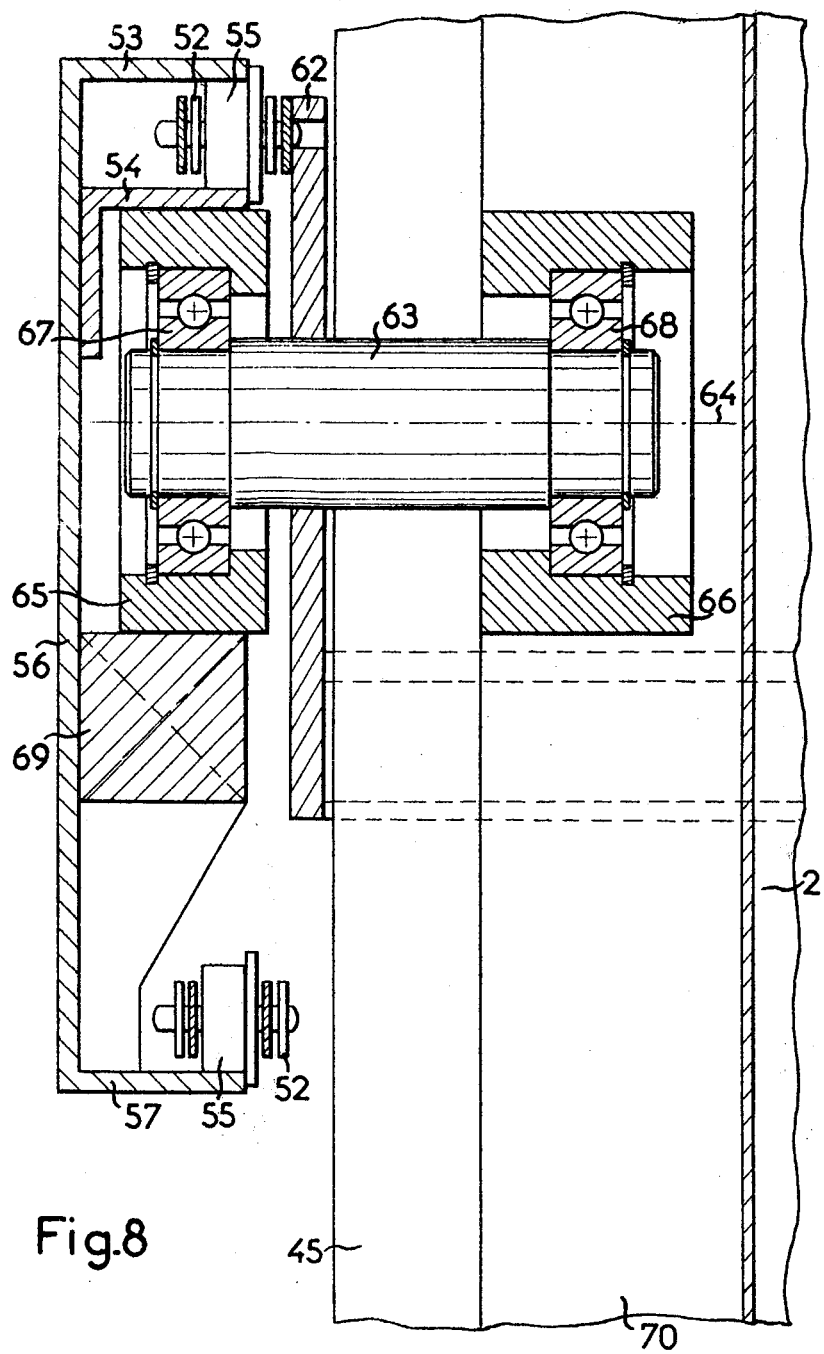
FIG. 8 is a view of one of the driving rollers for the retractable passage, in cross section in relation to the general direction of the said passage.

FIG. 8, shows, at 56, a U-section channel (affixed along the upper edge of the main lateral surface of the housing 9, in such a way that its two flanges 53 and 57 are horizontal). As mentioned above, the upper flange 53 and the horizontal flange 54 of a section mounted inside the section 56, e.g. by welding, constitute guide rails for the pulleys 55 of the chains bearing the floor of the passage. As regards the lower flange 57 of the section 56, it forms a path for the rollers of the part of the chain 52 which is being deflected.

To the chain 52, on the side corresponding to the stringer 45 of the flight of steps 2, is affixed a vertical plate 62, situated between the said stringer and the section 56, the plate 62 being connected to a corresponding plate situated on the side corresponding to the second stringer 46, in such a way as to form a sliding device in respect of the flight of steps 2. To the said plate 62 is affixed a cylindrical shaft 63, which passes through it from one side to the other and which has a horizontal axis 64 perpendicular to the general plane of the stringer 45 and to that of the section 56, i.e. to the plane of the surface 61 of the housing.

The two ends of this shaft 63 are provided with vertical rollers 65 and 66 respectively, mounted on the shaft via roller bearings 67 and 68 respectively. The roller 65 can move between the lower surface of the flange 54 and the upper horizontal surface of a member 69 affixed inside the section 56, e.g. by welding. As regards the roller 66, this can move along the stringer 45 of the flight of steps 2, which stringer is provided, for this purpose, with a longitudinal groove 70, of U-shaped cross section, facing outwards.

Thus, when the flight of steps 2 ascends or descends, the shaft 63 is forced to move horizontally, taking with it the chain 52, which, in conjunction with the other chain, situated on the side corresponding to the second stringer 46 of the flight of steps 2, moves the floor of the passage 44, keeping the first element 71 thereof in the immediate vicinity of the lower step of that part of the retractable flight of steps 2 which is in operation.

In a preferred embodiment of the mobile steps according to the invention, the level of the step referred to as the lower step always coincides with the level of the passage, in such a way as to ensure a constant "pitch" for the steps system as a whole: the flight of steps 2 and the platform 5 thus ascend or descend in multiples of the "pitch" of the steps system. In order to ensure that the level of the edge of the platform 5 coincides exactly with that of the door of the aircraft, the platform is fitted with a device of a known type enabling it to be inclined at a slight angle in respect of the horizontal. Users thus have the same step to negotiate at all levels.

It is obvious that mobile steps of this kind, particularly intended for the embarkation of air passengers, can also be used in connection with vessels. Numerous alternatives can be adopted without departing from the scope of the invention as defined in the claims; in particular, the shape, dimensions and relative positions of its various components may be modified.

I claim:

1. A passenger loading ramp, comprising;
   a chassis;
   a lower flight of steps fixed to said chassis, extending obliquely upwardly therefrom, and having an uppermost step;
   an upper flight of steps on said chassis having a first end portion movably disposed adjacent the uppermost step of the lower flight, having a second end portion remote from said uppermost step and extending obliquely upwardly, and having a substantially horizontal platform terminally fixed to said second end portion;
   means for vertically moving the platform and the second end portion of the upper flight of steps on the chassis and relative thereto; and
   retractable passage means for horizontally connecting the uppermost step of the lower flight of steps to the upper flight of steps, said passage means comprising a generally horizontal floor which is at least partly movable in a horizontal plane including said uppermost step to extend in said plane from said uppermost step to the intersection of said plane with the obliquely extending, second end portion of said upper flight of steps.

2. A ramp in accordance with claim 1, including means for accommodating the second end portion of the upper flight of steps, when said second end portion is not in use, underneath the retractable passage means.

3. A ramp in accordance with claim 1, further comprising correlating means for moving the retractable passage means in response to vertical movements of the upper flight of steps.

4. A ramp in accordance with claim 3, wherein said correlating means comprises; at least one set of rollers disposed to move, on the one hand, along the upper flight of steps, and on the other hand along the retractable passage means; and a horizontal rail disposed to guide the rollers when the upper flight of steps ascends or descends.

5. A ramp in accordance with claim 1, wherein said floor of the retractable passage means comprises a plurality of narrow, mutually adjacent interconnected plates, each plate extending transversely to the distance between the uppermost step and the second end portion of the upper flight; and return roller means for enabling the passage means to move around the same and to a level below that of said uppermost step.

6. A ramp in accordance with claim 1, wherein the upper flight of steps and the passage means are positioned to jointly provide a prolongation of the fixed flight of steps.

7. A ramp in accordance with claim 1, wherein the upper flight of steps and the passage means are positioned by the side of the fixed flight of steps.

8. A ramp in accordance with claim 1, wherein the second end portion of the retractable flight of steps is integral with the platform; said first and second end portions being hinged, one to the other, about a horizontal axis.

9. A ramp in accordance with claim 8, wherein the two end portions of the upper flight of steps have locking means adjacent said axis for enabling the two end portions to be rigidly secured to one another when each forms a linear prolongation of the other.

10. A ramp in accordance with claim 9, wherein the locking means comprises a finger parallel to said axis; and means defining a bore in one of the end portions of the upper flight of steps, for selective engagement with said finger.

* * * * *